(12) United States Patent
Neighbors et al.

(10) Patent No.: US 10,137,806 B2
(45) Date of Patent: Nov. 27, 2018

(54) VEHICLE LOAD FLOOR ACCESS PANEL SYSTEM

(71) Applicants: Kyle J Neighbors, Milford, MI (US); Jeffery E Long, Canton, MI (US); Jimmy L Suder, Ortonville, MI (US); James J Metcalf, Plymouth, MI (US); Stuart E Collins, New Haven, MI (US); Jereme A Berube, Sterling Heights, MI (US)

(72) Inventors: Kyle J Neighbors, Milford, MI (US); Jeffery E Long, Canton, MI (US); Jimmy L Suder, Ortonville, MI (US); James J Metcalf, Plymouth, MI (US); Stuart E Collins, New Haven, MI (US); Jereme A Berube, Sterling Heights, MI (US)

( * ) Notice: Subject to any disclaimer, the term of this patent is extended or adjusted under 35 U.S.C. 154(b) by 147 days.

(21) Appl. No.: 15/083,614

(22) Filed: Mar. 29, 2016

(65) Prior Publication Data

US 2017/0267131 A1 Sep. 21, 2017

Related U.S. Application Data

(60) Provisional application No. 62/148,783, filed on Apr. 17, 2015.

(51) Int. Cl.
*B60P 3/42* (2006.01)
*B60N 2/30* (2006.01)

(52) U.S. Cl.
CPC .................. *B60N 2/3075* (2013.01)

(58) Field of Classification Search
CPC ...................... B60N 2/3075; B60R 2011/0029
See application file for complete search history.

(56) References Cited

U.S. PATENT DOCUMENTS

| 5,195,795 | A | 3/1993 | Cannera et al. | |
|---|---|---|---|---|
| 6,279,982 | B1 | 8/2001 | Nishimura et al. | |
| 6,983,985 | B2 * | 1/2006 | McGowan | B60N 2/3011 296/66 |
| 7,377,571 | B2 | 5/2008 | Ewers et al. | |
| 7,422,047 | B1 | 9/2008 | McDonald | |

(Continued)

FOREIGN PATENT DOCUMENTS

FR 2899527 A1 * 10/2007 ........... B60N 2/3011

*Primary Examiner* — Lori L Lyjak
(74) *Attorney, Agent, or Firm* — Ralph E. Smith

(57) ABSTRACT

A vehicle including a storage compartment associated with the load floor, a stowable seat having a seat structure and configured to move between a deployed position and a stowed position where the stowable seat is stowed within the storage compartment, and a load floor access panel assembly. The load floor access panel assembly is movable between an open position providing access to the storage compartment, and a closed position where the load floor access panel assembly is in a substantially flat load floor configuration covering the storage compartment. The rearward panel includes a channel formed therein configured to receive the seat structure, and a seat structure access panel pivotally coupled to the rearward panel and configured to move between a load floor position where the seat structure access panel covers the channel, and an access position where the seat structure access panel is pivoted away from the channel.

17 Claims, 15 Drawing Sheets

(56) References Cited

U.S. PATENT DOCUMENTS

| | | |
|---|---|---|
| 7,699,388 B2 | 4/2010 | Mitjans |
| 8,485,583 B2 | 7/2013 | Mather et al. |
| 8,550,549 B2 | 10/2013 | Baker et al. |
| 8,632,113 B2 * | 1/2014 | Mather ................ B60N 2/2356 |
| | | 296/65.01 |
| 8,651,550 B2 | 2/2014 | Mather et al. |
| 8,708,393 B2 | 4/2014 | Mather et al. |
| 9,352,695 B1 * | 5/2016 | Karosa ................ B60N 2/3075 |
| 9,469,349 B1 * | 10/2016 | Mather ................ B62D 25/24 |
| 9,725,019 B2 * | 8/2017 | Mather ................ B60N 2/3075 |
| 2004/0061370 A1 | 4/2004 | Drew et al. |
| 2007/0210601 A1 * | 9/2007 | Phillips ................ B60N 2/3011 |
| | | 296/37.14 |

* cited by examiner

VEHICLE LOAD FLOOR ACCESS PANEL SYSTEM

CROSS REFERENCE TO RELATED APPLICATIONS

This application claims the benefit of U.S. Provisional Application Ser. No. 62/148,783, filed Apr. 17, 2015, the contents of which are incorporated herein by reference.

FIELD

The present application relates generally to a vehicle load floor access panel and, more particularly, to a fold-flat vehicle load floor access panel system that cooperates with a stowable seat and provides access to a storage area.

BACKGROUND

Stowable second and third row seating for vehicles is generally known and often includes a floor panel movable to provide access to a location where such stowable seats are stowed, especially with respect to the second-row of seating. Such floor panels can be complicated in nature and often include three to four hingedly connected panels to facilitate access to the seat stowage area. Operation of these floor panel arrangements is often not intuitive to a vehicle occupant and can also be cumbersome to manipulate to gain access to the storage/stowage area. Further, such floor panels often have to extend beyond legs of the second-row seat and thus include gaps or openings that are not covered when the seat is stowed. Thus, while known stowable seating systems work for their intended purpose, there remains a need for improvement in the relevant art.

SUMMARY

According to one exemplary aspect of the invention, a vehicle is provided. The vehicle includes a load floor, a storage compartment associated with the load floor, a stowable seat having a seat structure coupled to the vehicle, the stowable seat configured to move between a deployed position and a stowed position where the stowable seat is stowed within the storage compartment, and a load floor access panel assembly associated with the storage compartment and the stowable seat. The load floor access panel includes a forward panel pivotally coupled to the load floor, and a rearward panel pivotally coupled to the forward panel. The load floor access panel assembly is movable between an open position providing access to the storage compartment, and a closed position where the load floor access panel assembly is in a substantially flat load floor configuration covering the storage compartment. The rearward panel includes a channel formed therein configured to receive the seat structure when the stowable seat is in the deployed position and the load floor access panel is in the closed position, and a seat structure access panel pivotally coupled to the rearward panel and configured to move between a load floor position where the seat structure access panel covers the channel, and an access position where the seat structure access panel is pivoted away from the channel by the seat structure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

In accordance with various aspects of the invention and as will be discussed in greater detail below, a load floor access panel assembly is provided that overcomes the aforementioned disadvantages. In one exemplary implementation, the load floor access panel assembly includes a forward panel and a rearward panel that cooperate to provide a flat load floor as well as access to a storage area for storage and/or stowing/deploying an associated vehicle seat. In this exemplary implementation, the forward panel includes an integrated and independently movable access door for providing access to the storage area.

Further, in the exemplary implementation, the rearward panel includes one or more seat leg access panels configured to cooperate with the seat legs of the associated seat. The seat leg access panels are configured to move from a deployed position where the panels cover the gaps or openings formed in the rearward panel to provide a flat load floor when the seat is stowed, to an open position where the panels are rotated away from the openings to thereby receive and accommodate the seat legs when the seat is in the deployed position.

Figure 1:
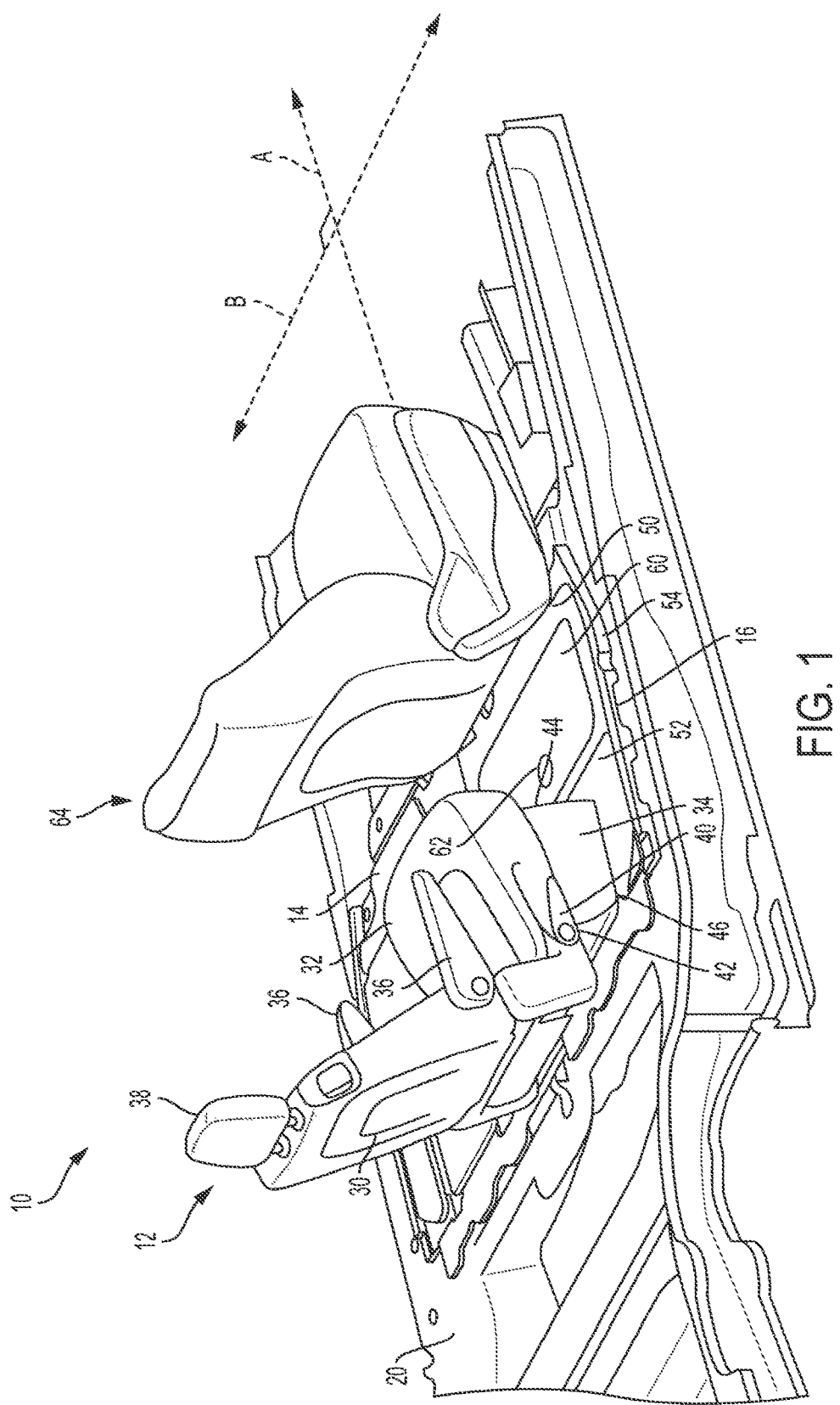
FIG. 1 is a perspective view of a partial vehicle interior having an exemplary load floor access panel assembly as well as a second-row stowable seat shown in a deployed position and cooperating with the access panel assembly in accordance with the principles of the present disclosure.
Figure 2:
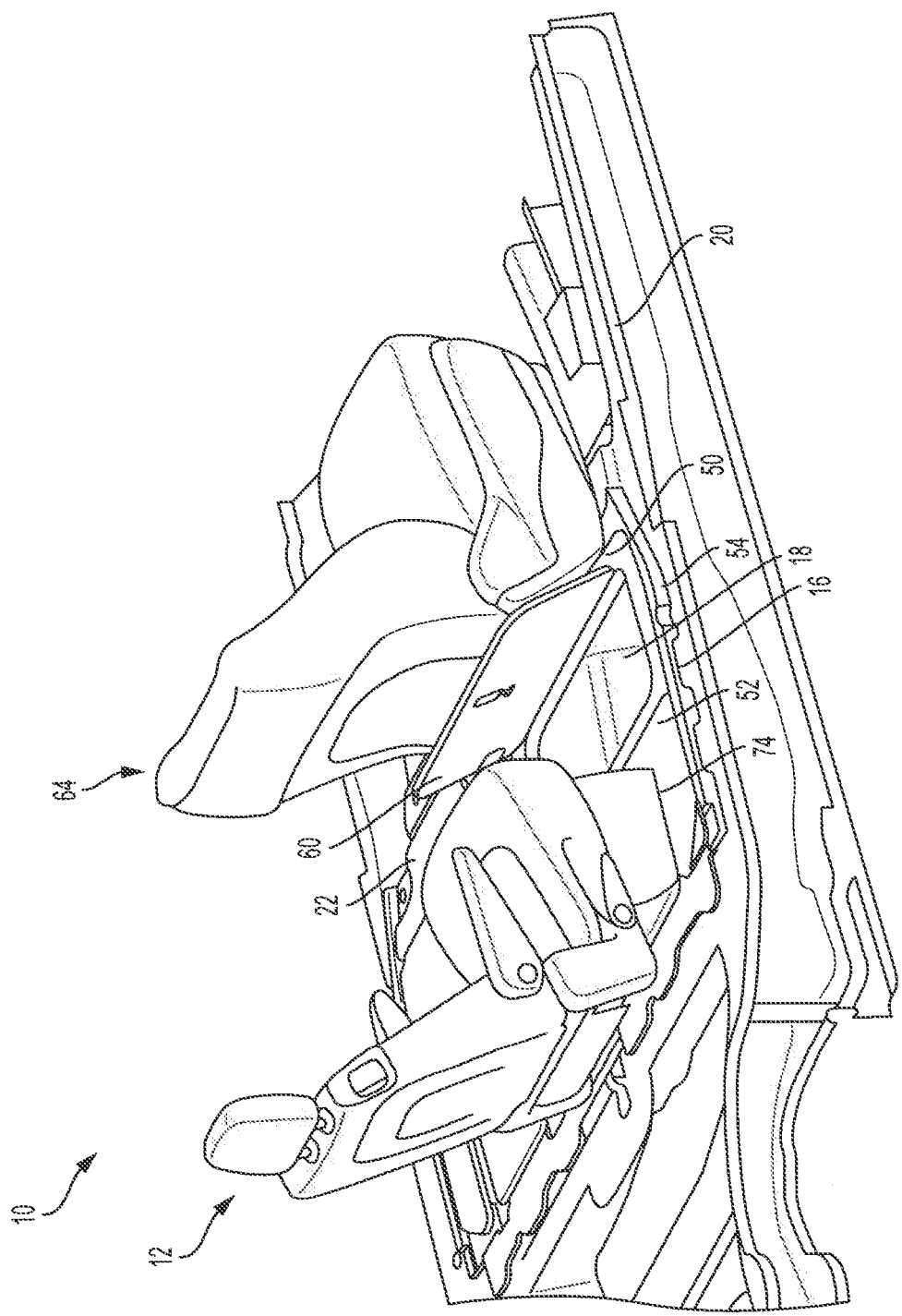
FIG. 2 is a perspective view of the load floor access panel assembly showing the integrated access door moved from a closed, fold-flat position while a remainder of the load floor access panel assembly remains in the deployed, flat load floor position in accordance with the principles of the present disclosure.
Figure 3:
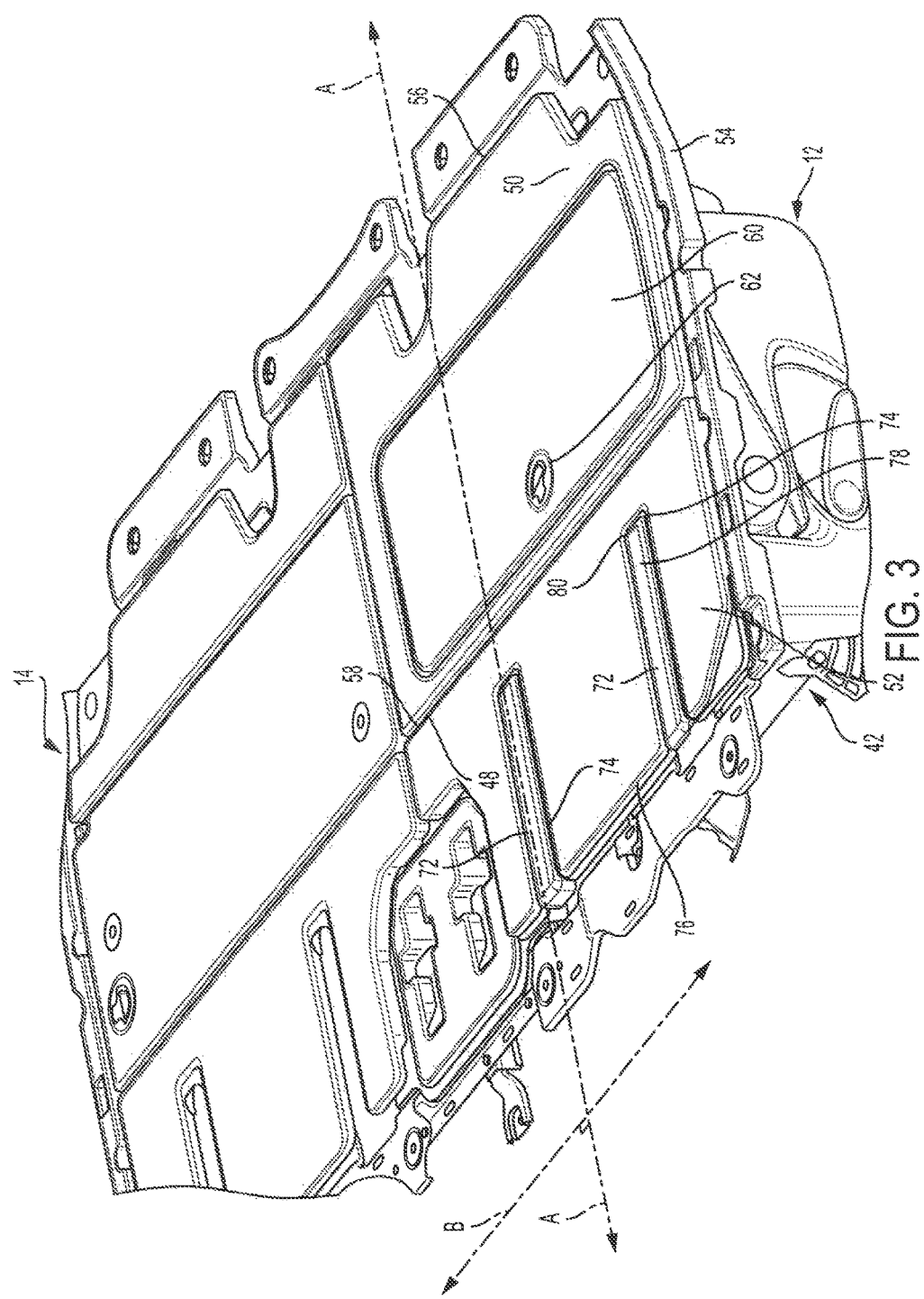
FIG. 3 is a perspective view of the load floor access panel assembly with the stowable seat in a stowed position/configuration beneath the access panel assembly, which is shown in a deployed, flat load floor position in accordance with the principles of the present disclosure.

With initial reference to FIGS. 1 and 2, according to various aspects of the present disclosure, an example vehicle interior 10 is partially illustrated generally having a vehicle seat 12 arranged with a load floor 14 having a load floor access panel assembly 16 for accessing a seat tub or storage compartment 18 under the load floor 14. The vehicle seat 12 is configured to couple to the load floor 14, a vehicle frame 20, and/or a storage compartment load floor 22 and, in the exemplary implementation, the vehicle seat 12 is configured as a second-row stowable seat that folds and/or tumbles into the storage compartment 18 (e.g., see FIG. 2). For example, the vehicle seat 12 may be stowed into storage compartment 18 to provide a flat load floor vehicle configuration, as shown in FIG. 3. When the vehicle seat 12 is stowed, a passageway can be provided to a rearward area of the vehicle for access to a cargo area and/or a third row of seating (not shown). In addition to being stowable, the vehicle seat 12 may also include ingress/egress and fore/aft adjustment assemblies. However, the vehicle seat 12 is not limited to second-row seating and may be used in various other vehicles or seating arrangements.

In one exemplary implementation, the vehicle seat 12 generally includes a seat back 30, a seat bottom 32, and a base structure 34. The seat back 30 includes a pair of arm rests 36 and a head rest 38 each coupled to the seat back 30 in any suitable manner. The seat bottom 32 may include a release mechanism 40 to facilitate collapsing the seat 12 to a collapsed position or to release the vehicle seat 12 from various other positions. The base structure 34 includes an articulation arrangement 42, and a pair of front legs 44 and rear legs 46 (see FIG. 8) operatively associated with the seat bottom 32 and articulation arrangement 42. The articulation arrangement 42 may be configured to assist in articulating and lowering the vehicle seat 12 toward a stowed position (FIG. 3), and articulating and raising seat 12 from the stowed position toward a seating or deployed position (FIG. 1).

With reference to FIGS. 1-8, the load floor access panel assembly 16 generally includes a forward panel 50, a rearward panel 52, and a frame or housing 54. In one exemplary implementation, the frame or housing 54 is part of the vehicle frame 20 or load floor 14. In another exemplary implementation, a portion or all of the frame or housing 54 is part of the load floor access panel assembly 16. The forward panel 50 is pivotally or hingedly coupled to the housing 54 at a forward edge 56, and is pivotally or hingedly coupled to a forward edge 58 of the rearward panel 52 at a panel rearward edge 48. In the deployed positions of the load floor access panel assembly 16, such as shown for example in FIGS. 1 and 3, the forward and rearward panels 50, 52 cooperate to form a flat load floor configuration in the deployed position.

As shown in FIG. 2, the forward panel 50 also includes an integrated access door 60 that is configured to move independently of the remaining components of the load floor access panel assembly 16 so as to provide convenient access to the storage area 18 without having to move or raise the entire load floor access panel assembly 16. In other words, the integrated access door 60 can be opened, such as using the illustrated latch 62, when the load floor access panel assembly 16 is in the deployed position while not moving a remainder of the forward access panel 50 and not moving the rearward access panel 52.

Figure 5:
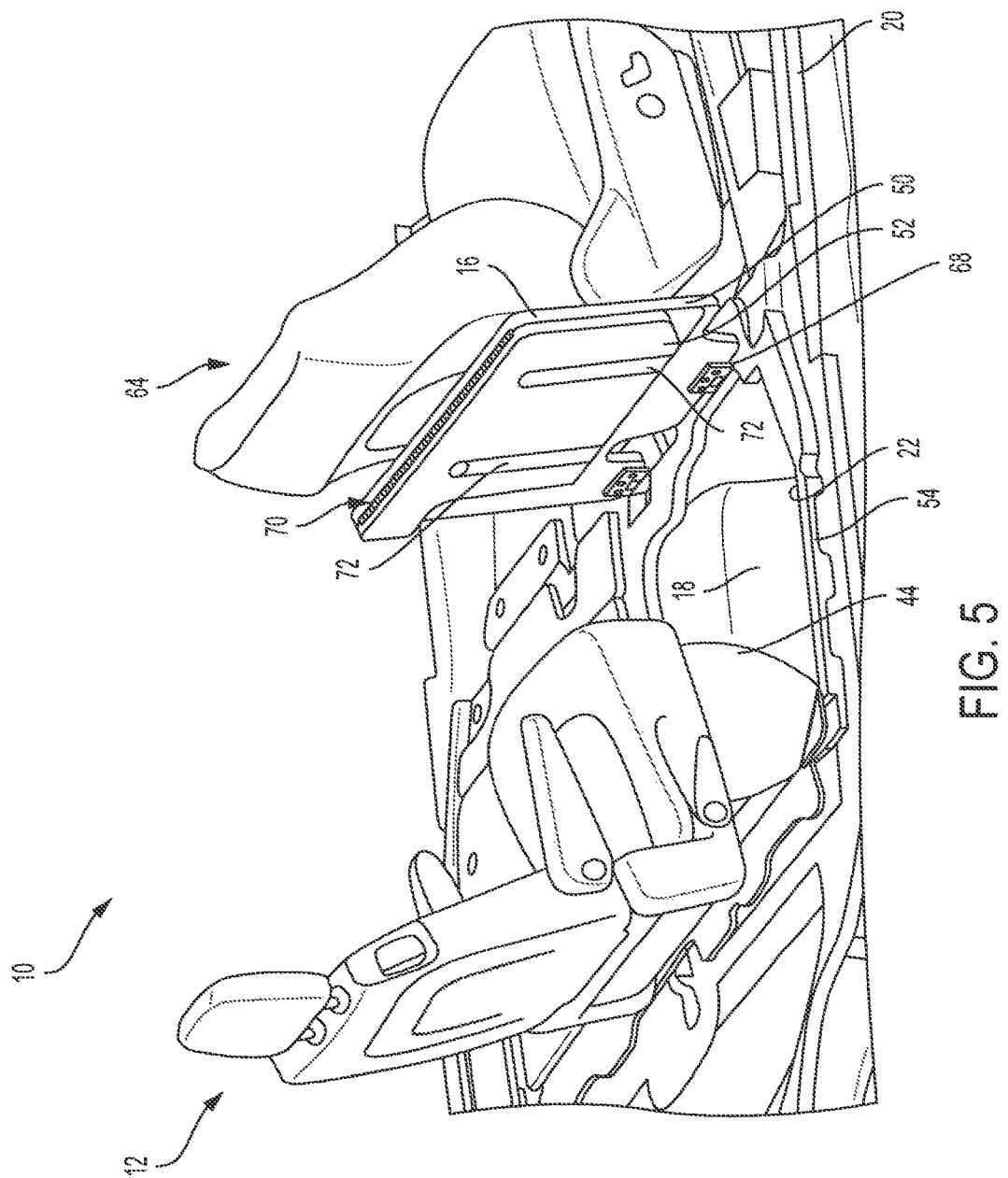
FIG. 5 is a perspective view of the load floor access panel assembly in an exemplary open position and showing a rearward panel pivoted flat against a forward panel of the load floor access panel assembly thereby providing access to the storage area in accordance with the principles of the present disclosure.

As shown in FIG. 5, the entire load floor access panel assembly 16 can also be opened to provide access to the storage area 18 and/or for stowing the deployed seat or deploying the stowed seat. In this regard, the load floor access panel assembly 16 is configured to, in connection with the stowable configuration of the associated second-row seat 12, provide appropriate access to the storage area 18 for stowing the second-row seat 12 even when a forward or first row seat 64 is in a rearward or rearmost position. For example, the forward panel 50 can be raised/pivoted upward to open the entire load floor access panel assembly 16. Pivotally raising the forward panel 50 about a forward end pivot point 68 causes pivoting and forward movement of the hingedly coupled rearward panel 52.

Continued pivotal movement of the forward panel 50 toward the front seat 64 raises the forward end 58 of the rearward panel 52, as well as translates the rearward panel 52 toward the front panel 50 and front seat 64. When the forward panel 50 is pivoted to an upright or substantially upright or open position, as shown in FIG. 5, the rearward panel 52 is collapsed or folded flat against an underside 66 of the forward panel 50. In one exemplary implementation, the rearward panel 52 can be removably coupled to the forward panel 50 in this position, such as with a magnet or strap (not shown), so as to removably maintain the rearward panel 52 folded flat against the forward panel 50 in the open position shown in FIG. 5.

In the exemplary implementation illustrated, the load floor access panel assembly 16 includes only the forward panel 50 and the rearward panel 52, thereby facilitating a simplified pivoting movement (only two pivot points 68, 70) to the open position, as well as to the compact, fold-flat configuration. Further, it will be appreciated that pivotally moving the forward panel 50 without independent releasing or opening the integrated access door 60 moves the integrated access door 60 with the forward panel 50, as also shown for example in FIGS. 5-8.

Figure 4:
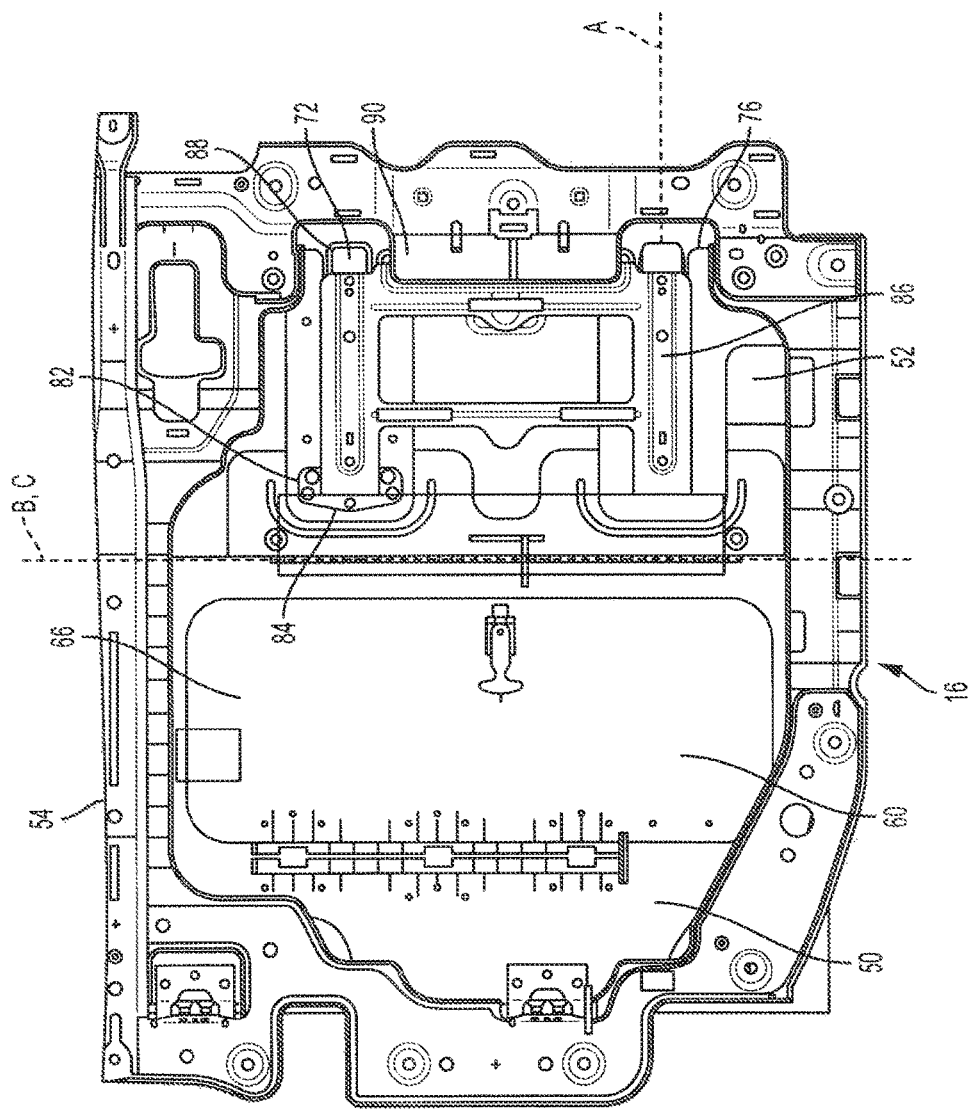
FIG. 4 is a bottom view of the load floor access panel assembly showing an exemplary frame member having articulatable seat leg access panels and cooperating with a vehicle frame portion to prevent movement of the seat leg access panels from a deployed flat load floor position when the seat is in the stowed position in accordance with the principles of the present disclosure.

With particular reference to FIGS. 3 and 4, the rearward panel 52 includes one or more seat structure or seat leg access panels 72 associated with the second-row seat 12, as will now be discussed in greater detail. As briefly discussed above, the seat leg access panels 72 are hingedly coupled to the rearward panel 52 and are configured to selectively provide access to gaps or channel openings 74 in the rearward panel 52 such that the forward seat legs 44 are selectively and slidably received within the openings 74.

More specifically, the rearward panel 52 includes two channels or openings 74 starting from a rearward edge 76 of the panel, as shown for example in FIG. 3. In the exemplary implementation illustrated, the openings 74 are blind channels and extend in a direction parallel to or substantially parallel to a longitudinal axis 'A' (see FIGS. 1 and 3) extending from a front of the vehicle to a rear of the vehicle (i.e., orthogonal to a cross-car axis 'B'). The openings 74 are aligned with and configured to slidably receive inboard and outboard front legs 44 of the associated seat 12 when the load floor access panel assembly 16 is in the deployed position (and positions proximate thereto) and the seat is in the deployed position, for example, as shown in FIGS. 1, 7, and 8.

Figure 7:
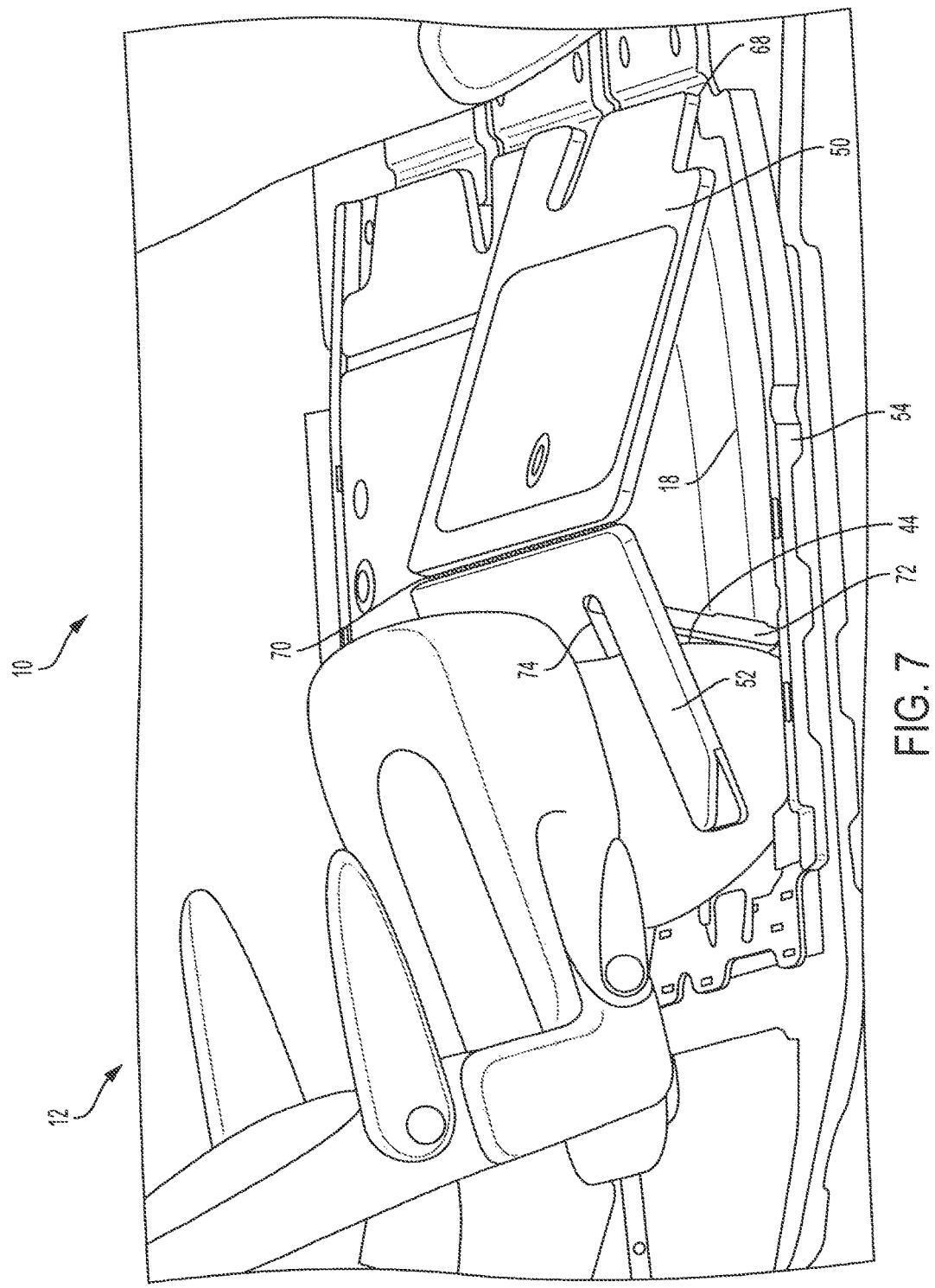
FIG. 7 is a perspective view of the load floor access panel assembly in an exemplary open position and showing the rearward panel pivoting relative to the forward panel with the seat leg access panels in contact with and moved by the seat legs to an exemplary open position in accordance with the principles of the present disclosure.
Figure 8:
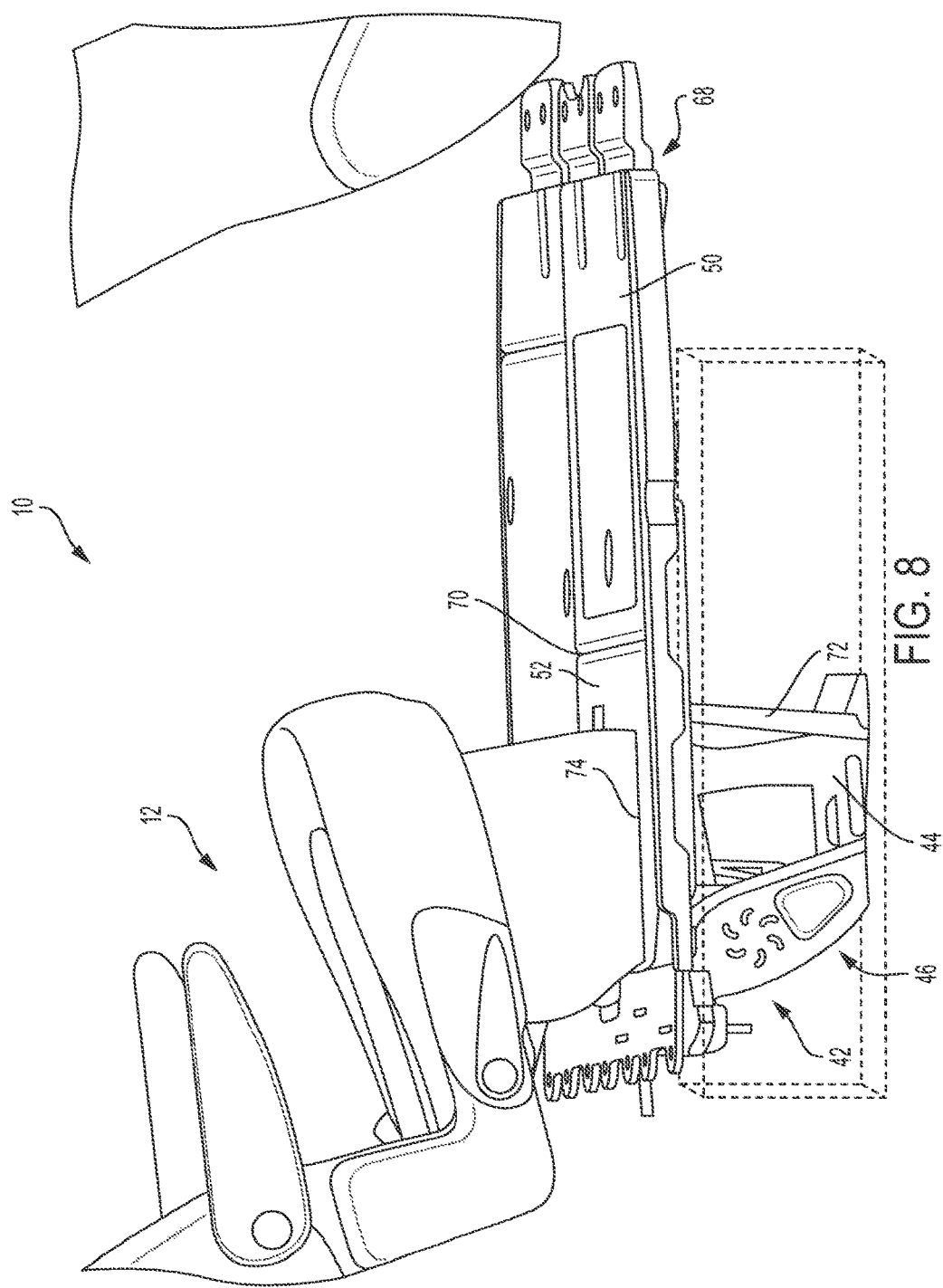
FIG. 8 is a perspective view of the load floor access panel assembly and the stowable seat each in deployed positions and showing the seat leg access panels of the rearward panel in contact with and moved by the seat legs to a fully or substantially fully open position in accordance with the principles of the present disclosure.

In the example implementation, one seat leg access panel 72 is pivotally coupled to the rearward panel 52 proximate to each access channel 74 so as to be movably received in the respective access channels 74, as shown for example in FIGS. 7 and 8. The seat leg access panels 72, shown in their deployed position in FIGS. 3 and 4, fill or substantially fill the access channels 74 so as to provide a flat load floor configuration for the rearward panel 52 substantially as if the access channels 74 were not present.

As shown in FIG. 4, in the exemplary implementation, the seat leg access panels 72 are hingedly coupled to the rearward panel 52 at a forward end 78 of the access panels 72 and proximate to or at a forward end (blind end) 80 of the access channels 74. Accordingly, leg access panels 72 are hingedly coupled to a bottom of the rearward panel 52 and rotate about an axis 'C' that is parallel to or substantially parallel to cross-car axis 'B'. In the exemplary implementation, this hinge coupling 82 includes a biasing mechanism, such as a torsion spring 84, configured to bias the access panels 72 to the deployed, flat load floor configuration. Moreover, access panels 72 may be coupled for unitary movement by a frame member 86 coupled to and extending between the access panels 72, as shown in FIG. 4 and discussed herein in more detail.

In this way, the seat leg access channels 74 enable the rearward panel 52 to extend rearward of the forward seat legs 44. This advantageously allows the storage area 18 to also extend rearward of the forward seat legs 44 while still being covered by the rearward access panel 52. Moreover, when the associated seat 12 is in the stowed position (FIG. 3), the seat leg access panels 72 are in the deployed position, thereby providing the flat load floor configuration for the load floor access panel assembly 16.

When the seat 12 is in the deployed position and load floor access panel assembly 16 is moved from the deployed, flat position (FIG. 1) to the open position (FIG. 5), the seat leg access panels 72 are biased by the hinge coupling 82 from the open or access position (FIGS. 1 and 8) to the deployed position (FIG. 3). Similarly, when the seat 12 is in the deployed position and the load floor access panel assembly 16 is moved from a fully open position (FIG. 5) (or a position where the rearward panel is spaced from the seat legs, such as FIG. 6) to the deployed position (FIG. 1), the seat leg access panels 72 cooperate with the forward seat legs 44 to move from the deployed position (FIG. 6) to the open or access position (FIGS. 7 and 8).

Figure 6:
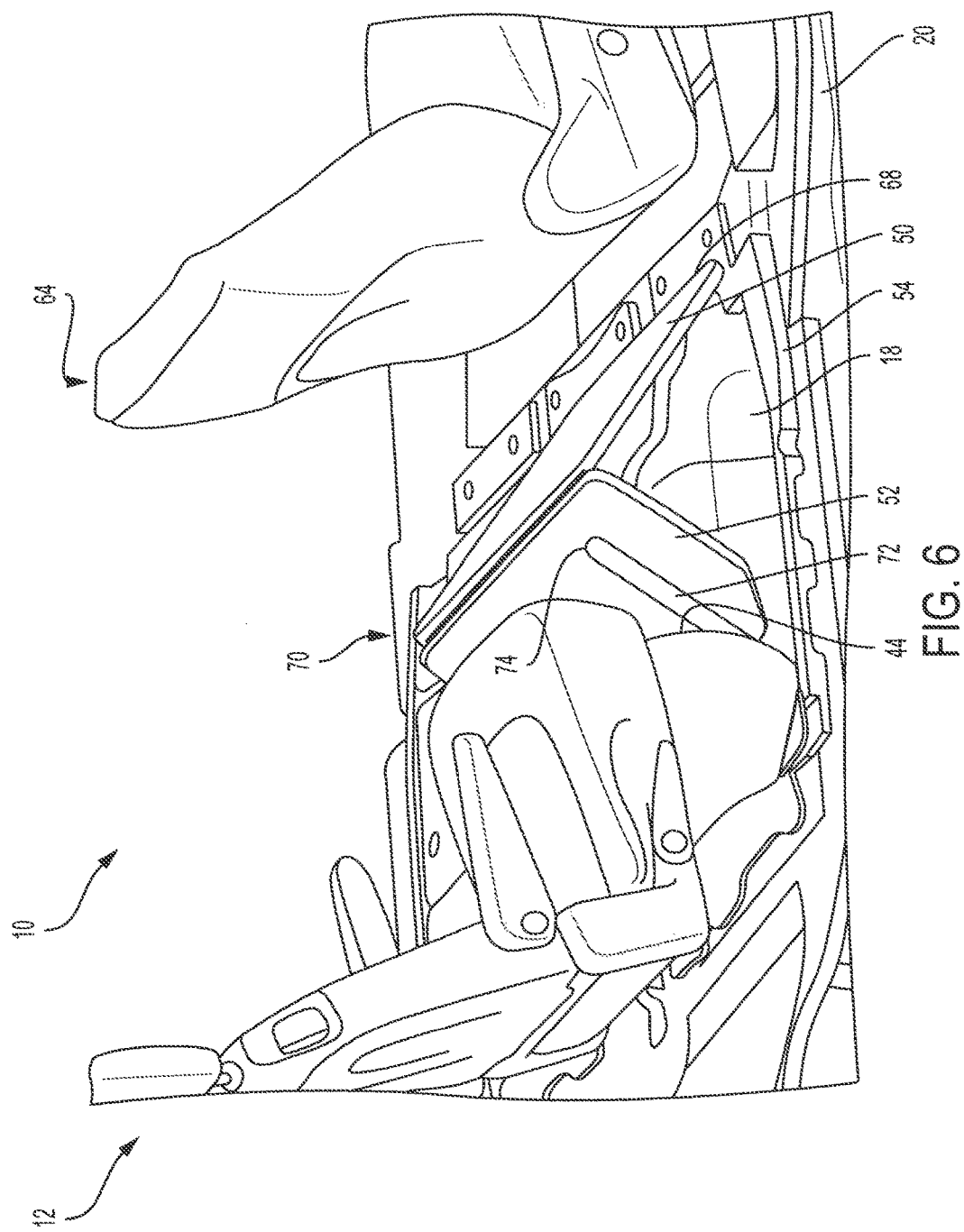
FIG. 6 is a perspective view of the load floor access panel assembly in an exemplary open position and showing the rearward panel pivoting relative to the forward panel with the seat leg access panels in the deployed flat load floor position and in initial contact with the seat legs in accordance with the principles of the present disclosure.

More specifically, and with reference to FIGS. 5-8, as the load floor access panel assembly 16 is moved from the open position (FIG. 5) toward and to the deployed flat load floor position (FIG. 8), the forward panel 50 is pivoted rearward toward the vehicle load floor 14 and the rearward panel 52 is translated and pivoted rearward with its rearward edge 76 ultimately leading, as shown for example in FIG. 6. During this movement, the seat leg access panels 72 are biased to the deployed position, as shown.

Upon continued movement of the load floor access panel assembly 16 toward the deployed position, the rearward panel 52 moves rearward such that the seat leg access panels 72 contact the respective forward seat legs 44, as shown in FIG. 7. In this position, the forward and rearward panels 50, 52 are sized, shaped and configured such that the rearward panel 52 is at an incline with its forward edge 58 higher than its rearward edge 76.

With continued movement of the load floor access panel assembly 16 toward the deployed position, the rearward panel 52 translates rearward and the seat leg access panels 72 cooperate with the seat legs 44 to pivot from the deployed position. More specifically, this continued rearward movement of the rearward panel 52 overcomes the biasing force of the hinged coupling 82 associated with the access panels 72 thereby pivoting the access panels 72 downward and allowing the seat legs 44 to begin to be slidably received within the seat leg access channels 74, as shown in FIG. 7.

Continued downward pivotal movement of the forward access panel 50 moves (translates and pivots) the rearward access panel 52 closer to the flat load floor configuration shown in FIG. 8, where the seat legs 44 move further into the respective access channels 74 and pivot the seat leg access panels 72 to their open position (FIG. 8), where they remain in a downwardly extending position and in contact with a forward side of the forward seat legs 44 while the seat 12 is in the deployed position.

With particular reference to FIG. 4, the exemplary frame member 86 associated with the seat leg access panels 72 will now be discussed in greater detail. In the exemplary implementation illustrated, the frame member 86 is coupled to an underside 88 of the seat leg access panels 72 and is configured to be positioned over a vehicle frame portion 90 when the load floor access panel assembly 16 is in the deployed configuration and the seat 12 is in the stowed position. This arrangement prevents the seat leg access panels 72 from being depressed (pivoted downward) when the load floor access panel assembly 16 is in the deployed position and the seat 12 is in the stowed position, as shown for example in FIG. 3. It will be appreciated that various structural configurations, such as tabs associated with each access panel, can be utilized to have the seat leg access panels 72 contact a vehicle frame portion to prevent undesired downward pivotal movement.

Figure 9:
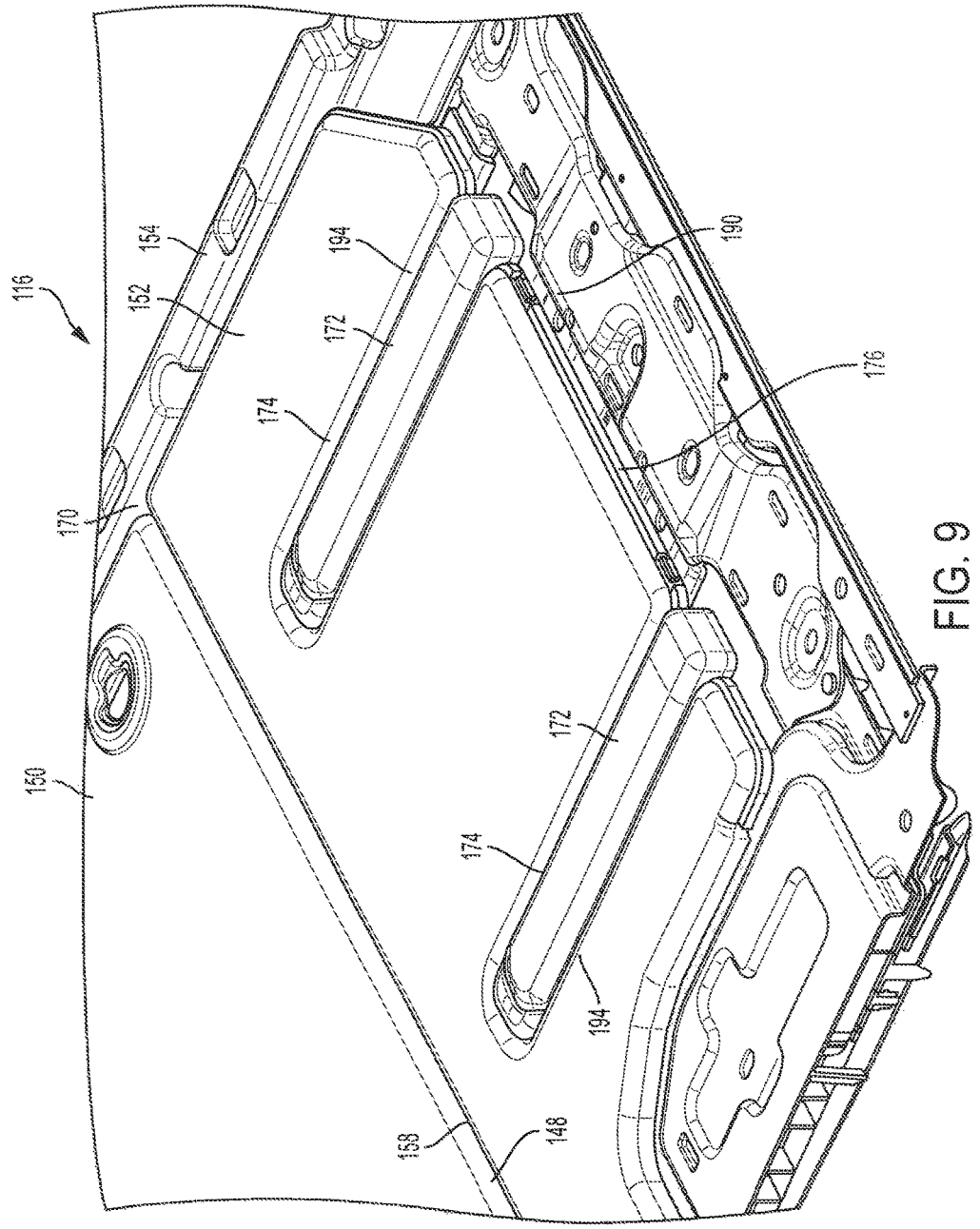
FIG. 9 is a perspective view of another exemplary load floor access panel assembly with articulatable seat leg access panels that may be utilized with the partial vehicle interior shown in FIG. 1, with the stowable seat in a stowed position beneath the access panel assembly, which is shown in a deployed, flat load floor position in accordance with the principles of the present disclosure.
Figure 10:
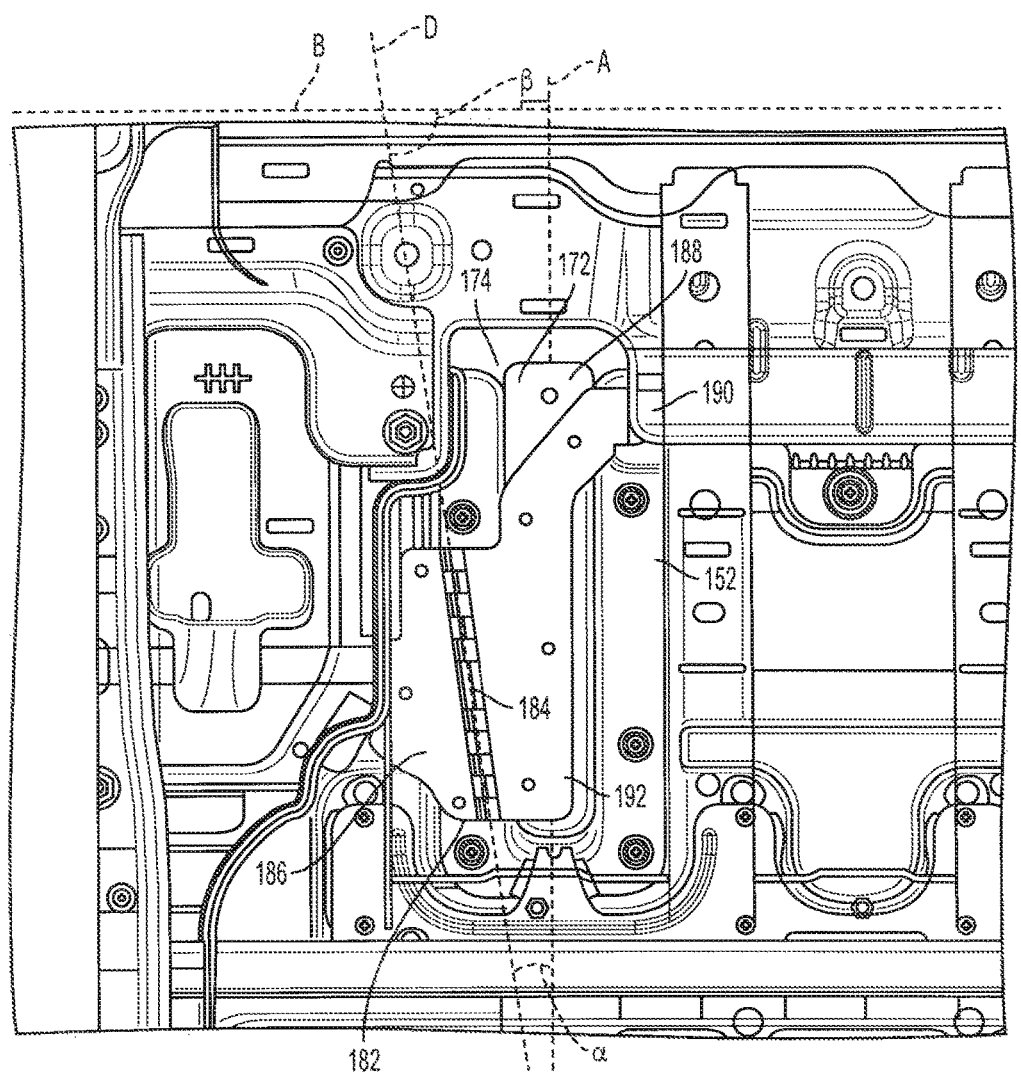
FIG. 10 is a partial bottom view of the load floor access panel assembly of FIG. 9 showing one exemplary frame member having one of the articulatable seat leg access panels and cooperating with a vehicle frame portion to prevent movement of the seat leg access panel from a deployed flat load floor position when the seat is in the stowed position in accordance with the principles of the present disclosure.
Figure 11:
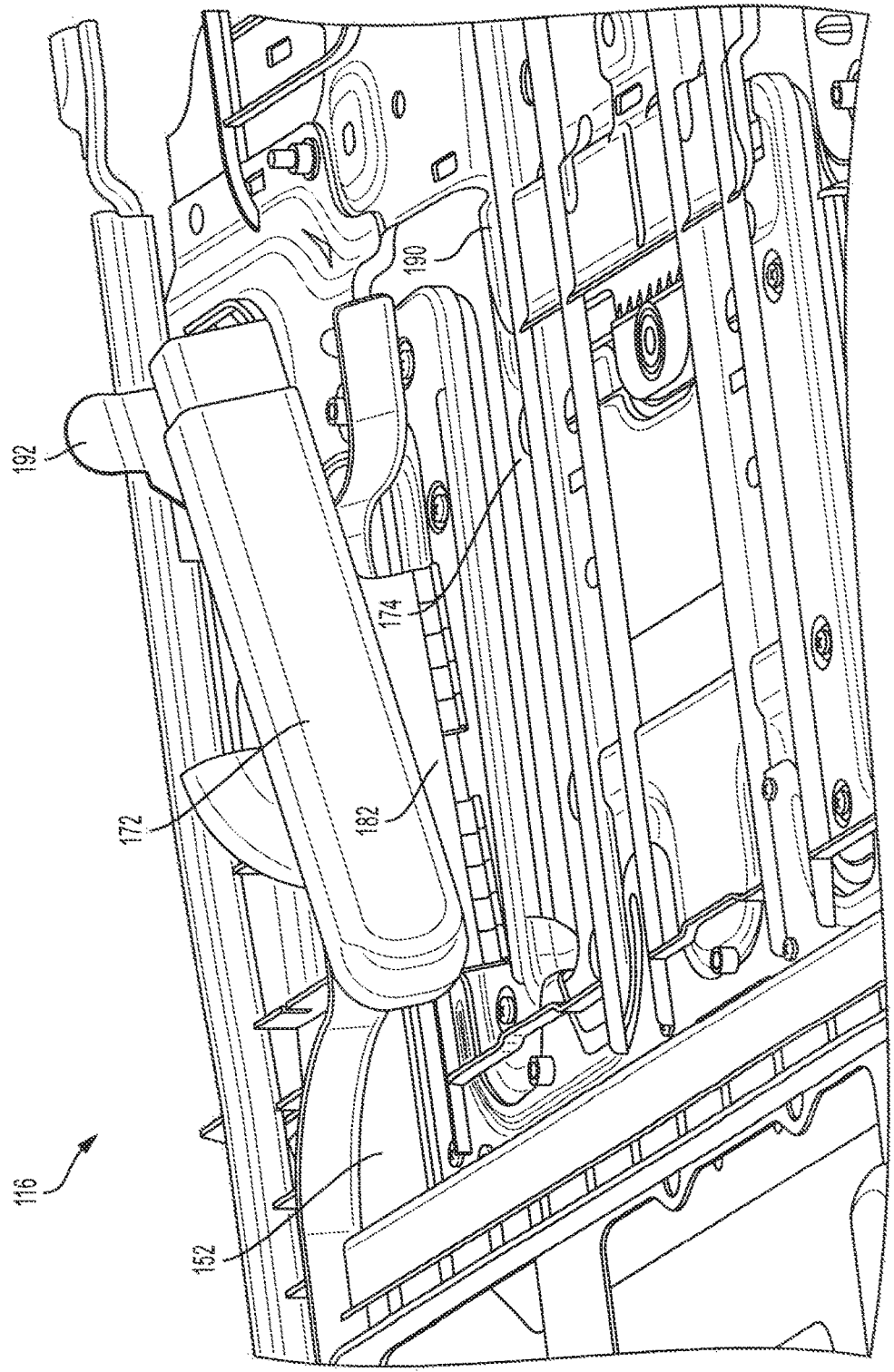
FIG. 11 is bottom perspective view of the load floor access panel assembly of FIG. 10 showing one of the seat leg access panels in a substantially fully open position in accordance with the principles of the present disclosure.

FIGS. 9-15 illustrate another example load floor access panel assembly 116 that may be utilized in the vehicle interior 10 instead of the load floor access panel assembly 16. The load floor access panel assembly 116 is similar to the load floor access panel assembly 16, except that assembly 116 includes seat leg access panels 72 with an alternative hinged coupling arrangement 182. As shown in FIGS. 10 and 11, the hinged coupling 182 is oriented at an angle relative to access panels 172, which enables panels 172 to fold downwardly and outward of the front set legs 44 when moving to the open position, as is described herein in more detail.

In the example implementation, the load floor access panel assembly 116 generally includes a forward panel 150, a rearward panel 152, and a frame or housing 154. In one exemplary implementation, the frame or housing 154 is part of the vehicle frame 20 or load floor 14. In another exemplary implementation, a portion or all of the frame or housing 154 is part of the load floor access panel assembly 116. The forward panel 150 is pivotally or hingedly coupled to the housing 154 at a forward edge 156, and is pivotally or hingedly coupled to a forward edge 158 of the rearward panel 152 at a panel rearward edge 148. In the deployed positions of the load floor access panel assembly 116, such as shown for example in FIGS. 9, 10, and 15, the forward and rearward panels 150, 152 cooperate to form a flat load floor configuration in the deployed position.

Although not specifically shown, the forward panel 150 may also include an integrated access door (similar to access door 60 described above) that is configured to move independently of the remaining components of the load floor access panel assembly 116 so as to provide convenient access to the storage area 18 without having to move or raise the entire load floor access panel assembly 116.

The entire load floor access panel assembly 116 can also be opened to provide access to the storage area 18 and/or for stowing the deployed seat or deploying the stowed seat. In this regard, the load floor access panel assembly 116 is configured to, in connection with the stowable configuration of the associated second-row seat 12, provide appropriate access to the storage area 18 for stowing the second-row seat 12 even when the forward or first row seat 64 is in a rearward or rearmost position. For example, the forward panel 150 can be raised/pivoted upward to open the entire load floor access panel assembly 116. Pivotally raising the forward panel 150 about a forward end pivot point 168 causes pivoting and forward movement of the hingedly coupled rearward panel 152.

Continued pivotal movement of the forward panel 150 toward the front seat 64 raises the forward edge 158 of the rearward panel 152, as well as translates the rearward panel 152 toward the front panel 150 and front seat 64. When the forward panel 150 is pivoted to an upright or substantially upright or open position, the rearward panel 152 is collapsed or folded flat against an underside 166 of the forward panel 150. In one exemplary implementation, the rearward panel 152 can be removably coupled to the forward panel 150 in this position, such as with a magnet or strap (not shown), so as to removably maintain the rearward panel 152 folded flat against the forward panel 150 in the open position, similar to that shown for assembly 16 in FIG. 5.

In the exemplary implementation illustrated, the load floor access panel assembly 116 includes only the forward panel 150 and the rearward panel 152, thereby facilitating a simplified pivoting movement (only two pivot points 168, 170) to the open position, as well as to the compact, fold-flat configuration. Further, it will be appreciated that pivotally moving the forward panel 150 without independent releasing or opening the integrated access door moves the integrated access door with the forward panel 150.

With particular reference to FIGS. 9-11, the rearward panel 152 includes one or more seat leg access panels 172 associated with the second-row seat 12, as will now be discussed in greater detail. In the example implementation, the seat leg access panels 172 are hingedly coupled to the rearward panel 152 and are configured to selectively provide access to gaps or channel openings 174 in the rearward panel 152 such that the forward seat legs 44 are selectively and slidably received within the openings 174.

Figure 13:
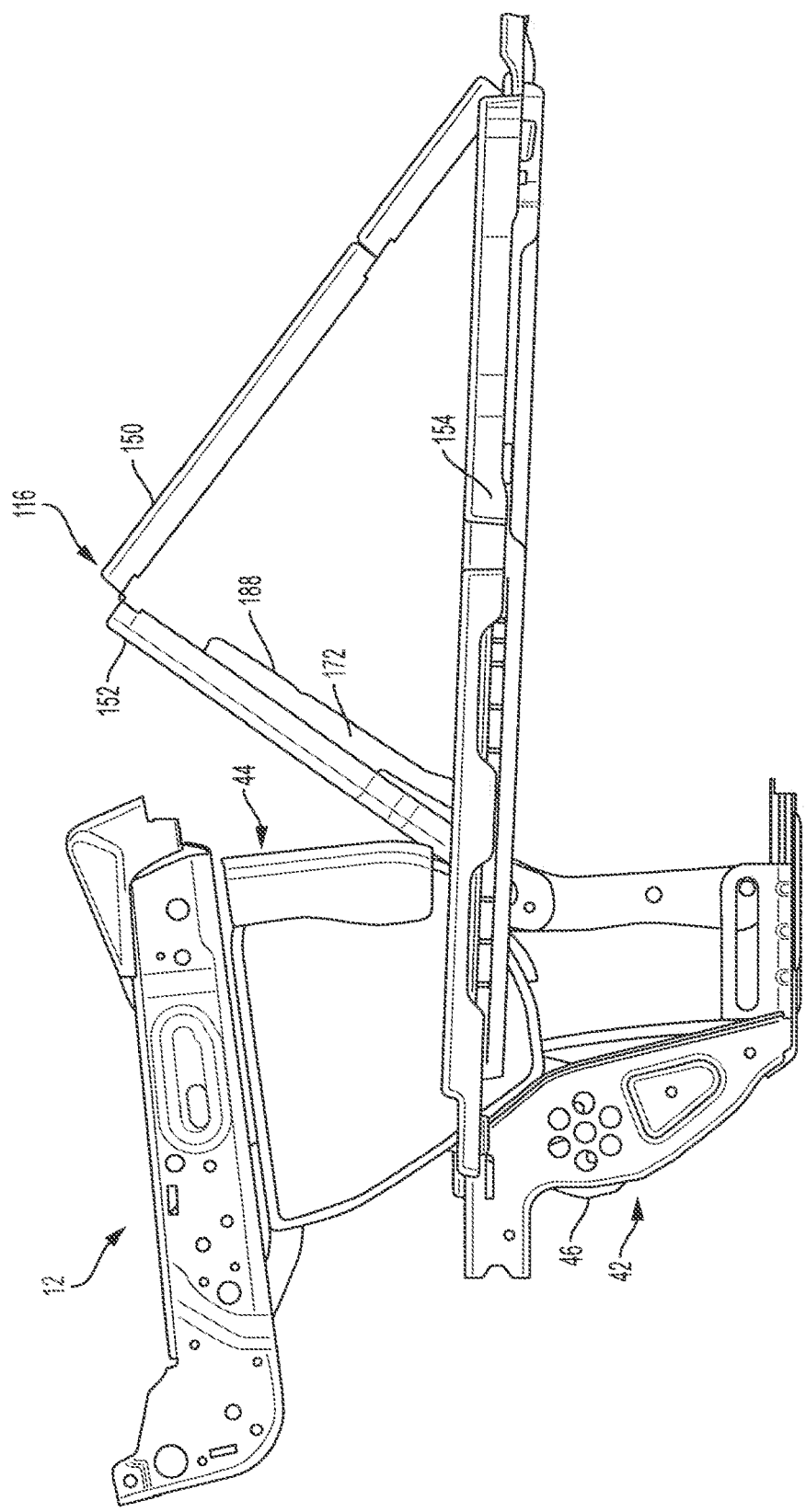
FIG. 13 is a side view of the load floor access panel assembly of FIG. 12 in an exemplary open position and showing the rearward panel pivoting relative to the forward panel with the seat leg access panels in contact with and moved by the seat legs to an exemplary open position in accordance with the principles of the present disclosure.
Figure 14:
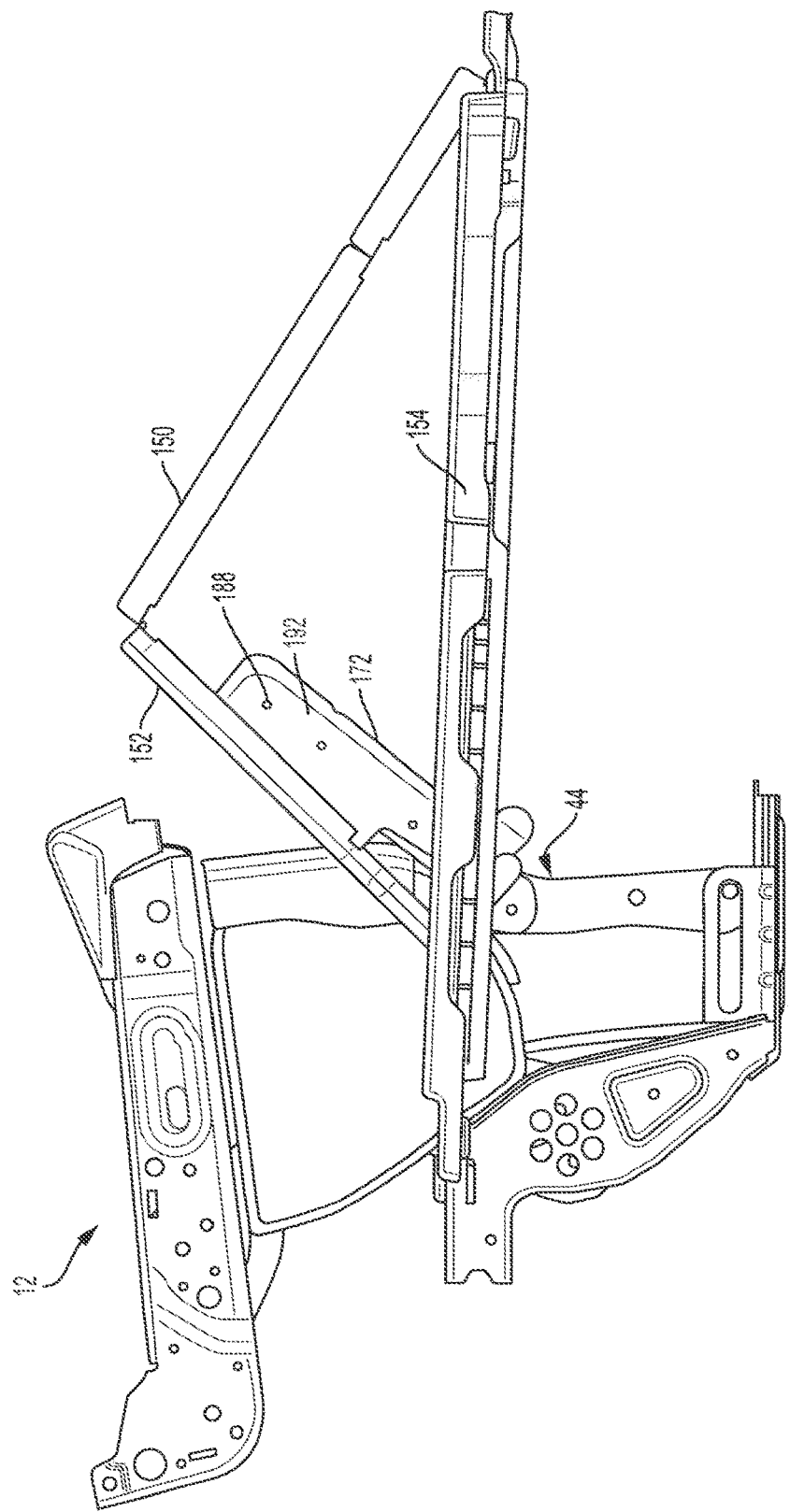
FIG. 14 is a side view of the load floor access panel assembly of FIG. 13 in a further exemplary open position and showing the rearward panel pivoting relative to the forward panel with the seat leg access panels in contact with and further moved by the seat legs to a further exemplary open position in accordance with the principles of the present disclosure.
Figure 15:
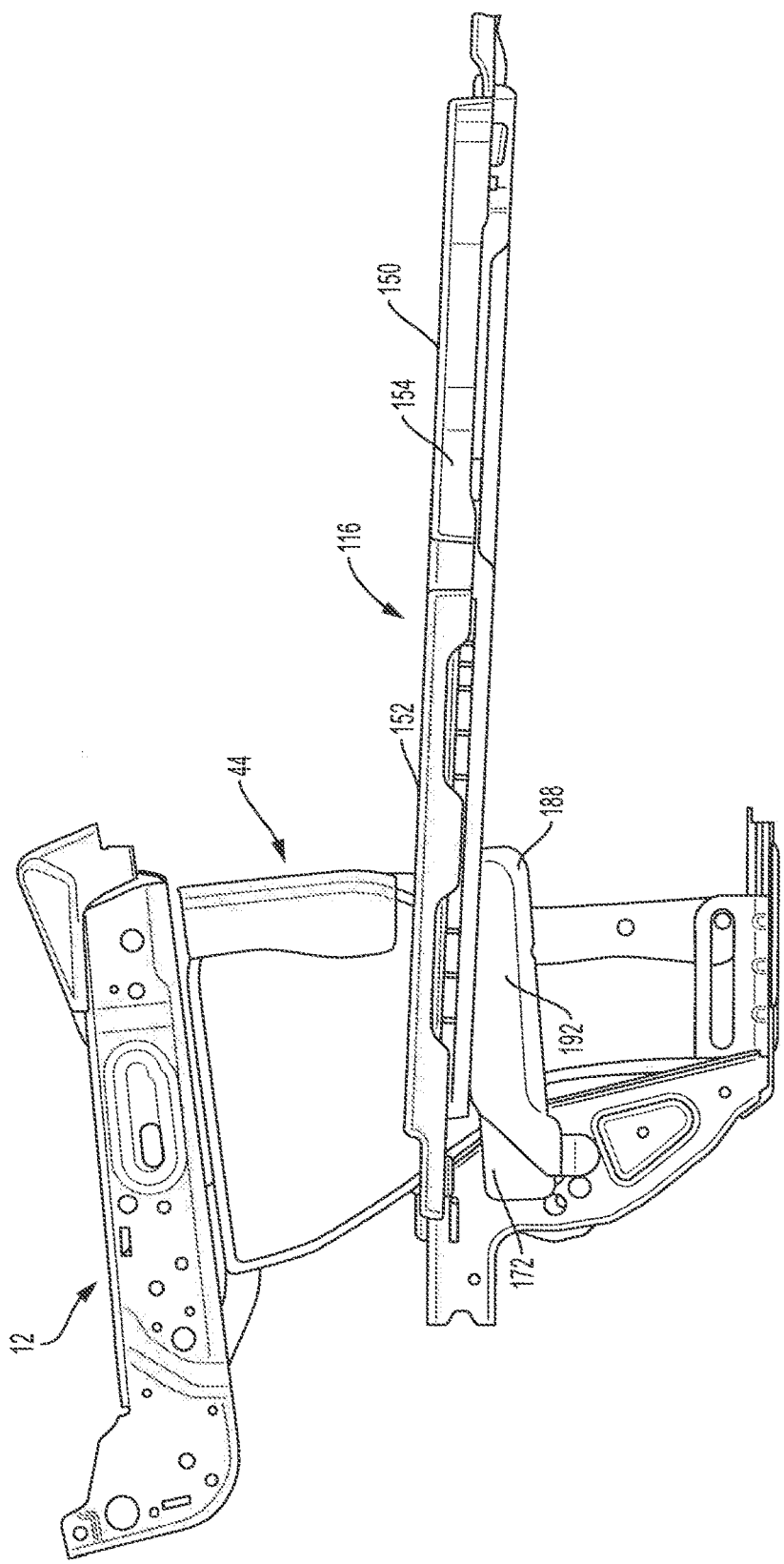
FIG. 15 is a side view of the load floor access panel assembly and the stowable seat of FIG. 14 each in deployed positions and showing the seat leg access panels of the rearward panel in contact with and further moved by the seat legs to a fully or substantially fully open position in accordance with the principles of the present disclosure.

More specifically, the rearward panel 152 includes two channels or openings 174 starting from a rearward edge 176 of the panel, as shown for example in FIG. 9. In the illustrated example, the openings 174 are blind channels and extend in a direction parallel to or substantially parallel to longitudinal axis 'A' (see FIGS. 9 and 10) extending from a front of the vehicle to a rear of the vehicle (i.e., orthogonal to cross-car axis 'B'). The openings 174 are aligned with and configured to slidably receive inboard and outboard front legs 44 of the associated seat 12 when the load floor access panel assembly 116 is in the deployed position (and positions proximate thereto) and the seat is in the deployed position, for example, as shown in FIGS. 13-15.

In the example implementation, one seat leg access panel 172 is pivotally coupled to the rearward panel 152 proximate to each access channel 174 so as to be movably received in the respective access channels 174, as shown for example in FIG. 9. The seat leg access panels 172, shown in their deployed position in FIGS. 9, 10, and 12, fill or substantially fill the access channels 174 so as to provide a flat load floor configuration for the rearward panel 152 substantially as if the access channels 174 were not present.

As shown in FIGS. 10 and 11, in the exemplary implementation, the seat leg access panels 172 are hingedly coupled to the rearward panel 152 along a substantial portion of the access panels 172 and proximate to or along an outboard edge 194 of the access channels 174. Moreover, access panels 172 are hingedly coupled to rearward panel 152 at an angle relative thereto. Accordingly, leg access panels 172 are hingedly coupled to a bottom of the rearward panel 152 and rotate about an axis 'D' that is oriented at an angle α relative to the longitudinal vehicle axis 'A' and at an angle β relative to the cross-car axis 'B' (see FIG. 10). In this way, access panels 172 fold or rotate downwardly and outwardly away from the legs 44 when panel 172 comes into contact therewith.

With particular reference to FIGS. 10 and 11, hinge coupling 182 includes a biasing mechanism (e.g., torsion spring 184), a first frame member 186, and a second frame member 192. In the illustrated example, torsion spring 184 is configured to bias the access panels 172 to the deployed, flat load floor configuration. The first frame member 186 is coupled to the bottom of the rearward panel 152, and the second frame member 192 is coupled to an underside 188 of the seat leg access panels 172 and is configured to be positioned over a vehicle frame portion 190 when the load floor access panel assembly 116 is in the deployed configuration and the seat 12 is in the stowed position. This arrangement prevents the seat leg access panels 172 from being depressed (pivoted downward) when the load floor access panel assembly 116 is in the deployed position and the seat 12 is in the stowed position, as shown for example in FIG. 10. It will be appreciated that various structural configurations, such as tabs associated with each access panel, can be utilized to have the seat leg access panels 172 contact a vehicle frame portion to prevent undesired downward pivotal movement.

In this way, the seat leg access channels 174 enable the rearward panel 152 to extend rearward of the forward seat legs 44. This advantageously allows the storage area 18 to also extend rearward of the forward seat legs 44 while still being covered by the rearward access panel 152. Moreover, when the associated seat 12 is in the stowed position (FIG. 9), the seat leg access panels 172 are in the deployed position, thereby providing the flat load floor configuration for the load floor access panel assembly 116.

When the seat 12 is in the deployed position and load floor access panel assembly 116 is moved from the deployed, flat position (FIG. 9) to the open position discussed above, the seat leg access panels 172 are biased by the hinge coupling 182 from the open or access position (FIGS. 11 and 15) to the deployed position (FIGS. 9 and 10). Similarly, when the seat 12 is in the deployed position and the load floor access panel assembly 116 is moved from a fully open position (or a position where the rearward panel is spaced from the seat legs, such as FIG. 12), the seat leg access panels 172 cooperate with the forward seat legs 44 to move from the deployed position (FIG. 9) to the open or access position (FIGS. 11 and 15). In the open or access position, the access panels 172 extend along an outboard side of the seat legs 44.

Figure 12:
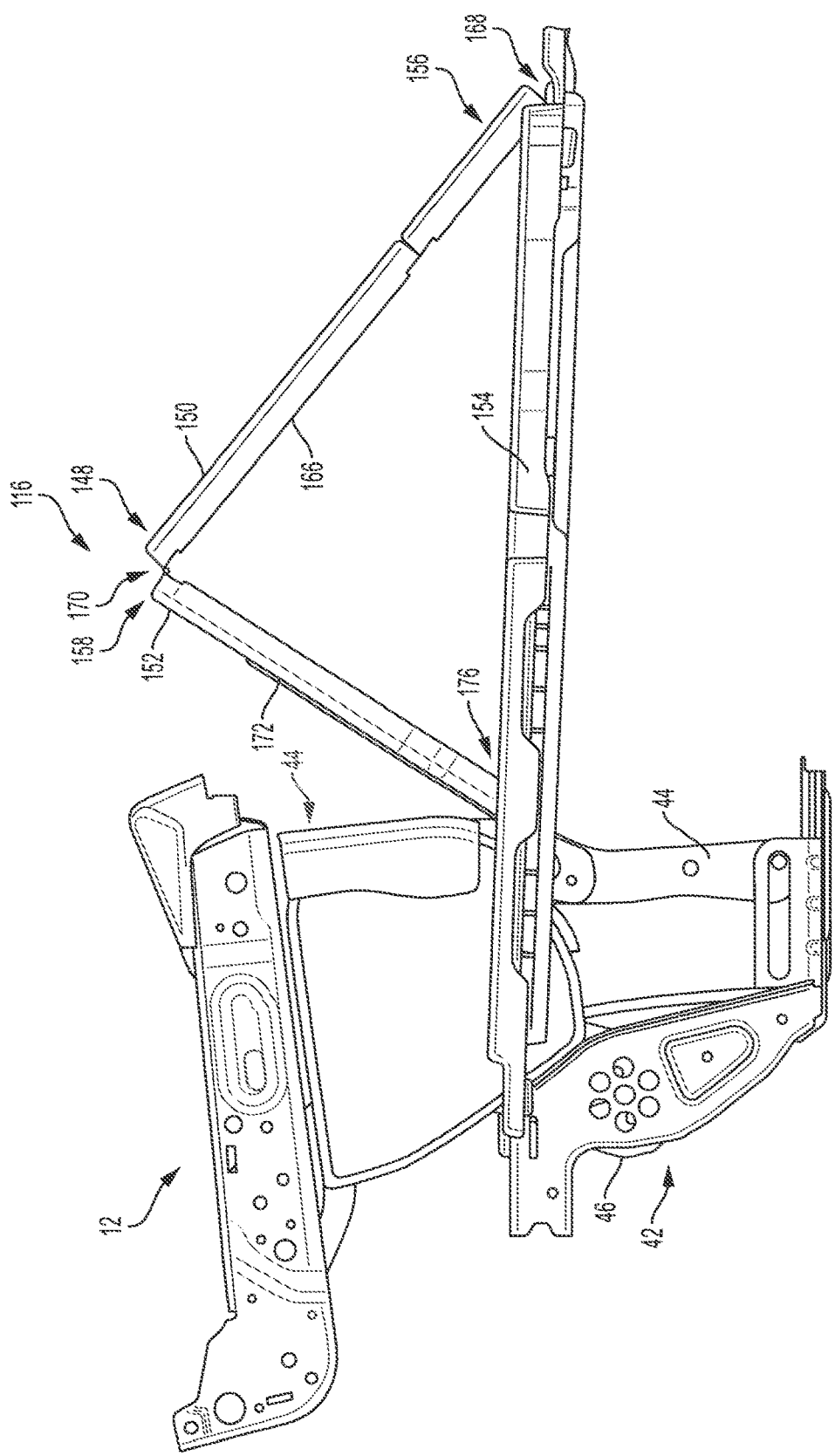
FIG. 12 is a side view of the load floor access panel assembly of FIG. 9 in an exemplary open position and showing the rearward panel pivoting relative to the forward panel with the seat leg access panels in the deployed flat load floor position and in initial contact with the seat legs in accordance with the principles of the present disclosure.

More specifically, and with reference to FIGS. 12-15, as the load floor access panel assembly 116 is moved from the open position toward and to the deployed flat load floor position, the forward panel 150 is pivoted rearward toward the vehicle load floor 14 and the rearward panel 152 is translated and pivoted rearward with its rearward edge 176 ultimately leading, as shown for example in FIG. 12. During this movement, the seat leg access panels 172 are biased to the deployed position, as shown.

Upon continued movement of the load floor access panel assembly 116 toward the deployed position, the rearward panel 152 moves rearward such that the seat leg access panels 172 contact the respective forward seat legs 44, as shown in FIG. 13. In this position, the forward and rearward panels 150, 152 are sized, shaped and configured such that the rearward panel 152 is at an incline with its forward edge 158 higher than its rearward edge 176.

With continued movement of the load floor access panel assembly 116 toward the deployed position, the rearward panel 152 translates rearward and the seat leg access panels 172 cooperate with the seat legs 44 to pivot from the deployed position. More specifically, this continued rearward movement of the rearward panel 152 overcomes the biasing force of the hinged coupling 182 associated with the access panels 172 thereby pivoting the access panels 172 downward and outward, thereby allowing the seat legs 44 to begin to be slidably received within the seat leg access channels 174, as shown in FIG. 14.

Continued downward pivotal movement of the forward access panel 150 moves (translates and pivots) the rearward access panel 152 closer to the flat load floor configuration shown in FIG. 15, where the seat legs 44 move further into the respective access channels 174 and pivot the seat leg access panels 172 to their open position (FIGS. 11 and 15), where they remain in contact with the outboard sides of the forward seat legs 44 while the seat 12 is in the deployed position. Alternatively, the access panels 152 may be configured for downward and inward movement where they remain in contact with the inboard sides of the forward seat legs 44.

Described herein are systems and methods for a fold-flat vehicle load floor access panel system that cooperates with a stowable seat and provides access to a storage area. The panel system includes a two-panel arrangement with a rearward panel having seat leg access panels that are biased into a deployed position to cover channels formed in the rearward panel. When a vehicle seat is deployed and the panel system is moved to a closed position, the vehicle seat legs force the access panels out of the channels such that the seat legs can be subsequently received within the channels. Accordingly, the access panels are hingedly connected to the rearward panel such that they move downwardly and, in some embodiments outwardly, to provide clearance to a deployed seat.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle comprising:
a load floor;
a storage compartment associated with the load floor;
a stowable seat having a seat structure coupled to the vehicle, the stowable seat configured to move between a deployed position and a stowed position where the stowable seat is stowed within the storage compartment; and
a load floor access panel assembly associated with the storage compartment and the stowable seat, the load floor access panel including a forward panel pivotally coupled to the load floor, and a rearward panel pivotally coupled to the forward panel, the load floor access panel assembly movable between an open position providing access to the storage compartment, and a closed position where the load floor access panel assembly is in a substantially flat load floor configuration covering the storage compartment;
wherein the rearward panel includes a channel formed therein configured to receive the seat structure when the stowable seat is in the deployed position and the load floor access panel is in the closed position, and a seat structure access panel pivotally coupled to the rearward panel and configured to move between a load floor position where the seat structure access panel covers the channel, and an access position where the seat structure access panel is pivoted away from the channel by the seat structure;
wherein the seat structure access panel is rotatably coupled to the rearward panel by a hinge coupling that includes a biasing mechanism configured to bias the seat structure access panel to the closed position within the channel.

2. The vehicle of claim 1, wherein the seat structure includes two legs, the rearward panel includes two channels to receive the two legs, and the rearward panel includes two seat structure access panels coupled thereto and configured to each cover one of the two channels when the seat is in the stowed position.

3. The vehicle of claim 1, wherein the forward panel includes a forward edge and a rearward edge, and the rearward panel includes a forward edge and a rearward edge; and wherein the forward edge of the forward panel is rotatably coupled to the load floor, and the rearward edge of the forward panel is rotatably coupled to the forward edge of the rearward panel.

4. The vehicle of claim 3, wherein the channel extends from the rearward edge of the rearward panel toward the forward edge of the rearward panel.

5. The vehicle of claim 1, wherein the vehicle includes a longitudinal axis extending from a front of the vehicle to a rear of the vehicle, and wherein the channel extends along a channel axis substantially parallel to the longitudinal axis.

6. The vehicle of claim 5, wherein the seat structure access panel rotates about an access panel axis that is substantially orthogonal to the channel axis.

7. The vehicle of claim 6, wherein the seat structure includes a seat leg, and wherein the seat structure access panel engages a forward side of the seat leg in moving from the load floor position to the access position, the seat structure access panel remaining in engagement with the front side of the seat leg when the seat is in the deployed position and the load floor access panel is in the closed position.

8. The vehicle of claim 6, wherein the forward panel rotates about a first axis substantially orthogonal to the longitudinal axis, and the rearward panel rotates about a second axis substantially parallel to the first axis.

9. The vehicle of claim 1, wherein the biasing mechanism is a torsion spring.

10. The vehicle of claim 1, wherein the seat structure access panel is sized and shaped to fill the channel so as to provide a flat load floor configuration for the rearward panel substantially as if the access channel was not present.

11. The vehicle of claim 1, wherein the seat structure access panel is moved from the closed position to the open position by contact with the seat structure when the load floor access panel assembly is moved toward the closed position.

12. The vehicle of claim 1, wherein the forward panel includes an integrated access door that is configured to move independently of the forward panel and the rearward panel.

13. A vehicle comprising:
a load floor;
a storage compartment associated with the load floor;
a stowable seat having a seat structure coupled to the vehicle, the stowable seat configured to move between a deployed position and a stowed position where the stowable seat is stowed within the storage compartment; and
a load floor access panel assembly associated with the storage compartment and the stowable seat, the load floor access panel including a forward panel pivotally coupled to the load floor, and a rearward panel pivotally coupled to the forward panel, the load floor access panel assembly movable between an open position providing access to the storage compartment, and a closed position where the load floor access panel assembly is in a substantially flat load floor configuration covering the storage compartment;
wherein the rearward panel includes a channel formed therein configured to receive the seat structure when the stowable seat is in the deployed position and the load floor access panel is in the closed position, and a seat structure access panel pivotally coupled to the rearward panel and configured to move between a load floor position where the seat structure access panel covers the channel, and an access position where the seat structure access panel is pivoted away from the channel by the seat structure; and
wherein the load floor access panel assembly further includes a frame member coupled to the seat structure access panel and configured to engage a frame portion of the vehicle when the load floor access panel is in the load floor position and the seat is in the stowed position to prevent the seat structure access panel from being depressed when the load floor access panel assembly is in the closed position and the seat is in the stowed position.

14. A vehicle comprising:
a load floor;
a storage compartment associated with the load floor;
a stowable seat having a seat structure coupled to the vehicle, the stowable seat configured to move between a deployed position and a stowed position where the stowable seat is stowed within the storage compartment; and
a load floor access panel assembly associated with the storage compartment and the stowable seat, the load floor access panel including a forward panel pivotally coupled to the load floor, and a rearward panel pivotally coupled to the forward panel, the load floor access panel assembly movable between an open position providing access to the storage compartment, and a closed position where the load floor access panel assembly is in a substantially flat load floor configuration covering the storage compartment;
wherein the rearward panel includes a channel formed therein configured to receive the seat structure when the stowable seat is in the deployed position and the load floor access panel is in the closed position, and a seat structure access panel pivotally coupled to the rearward panel and configured to move between a load floor position where the seat structure access panel covers the channel, and an access position where the seat structure access panel is pivoted away from the channel by the seat structure;
wherein the vehicle includes a longitudinal axis extending from a front of the vehicle to a rear of the vehicle, and wherein the channel extends along a channel axis substantially parallel to the longitudinal axis; and
wherein the seat structure access panel rotates about an access panel axis that is oriented at an angle relative to both the channel axis and a cross-car axis.

15. The vehicle of claim 14, wherein the seat structure includes a seat leg, and wherein the seat structure access panel engages an outboard side of the seat leg in moving from the load floor position to the access position, the seat structure access panel remaining in engagement with the outboard side of the seat leg when the seat is in the deployed position and the load floor access panel is in the closed position to maintain the seat structure access panel in the access position.

16. The vehicle of claim 15, wherein when the seat is in the deployed position and the load floor access panel assembly is in the closed position, the seat leg is received in the access channel and the seat structure access panel is in engagement with and biased by the seat leg to the access position where the seat structure access panel extends along the outboard side of the seat leg.

17. The vehicle of claim 15, wherein the seat structure access panel rotates downwardly relative to the rearward panel and outwardly away from the leg when the seat structure access panel engages the seat leg upon moving the load floor access panel assembly from the open position to the closed position.

* * * * *